United States Patent Office 2,800,338
Patented July 23, 1957

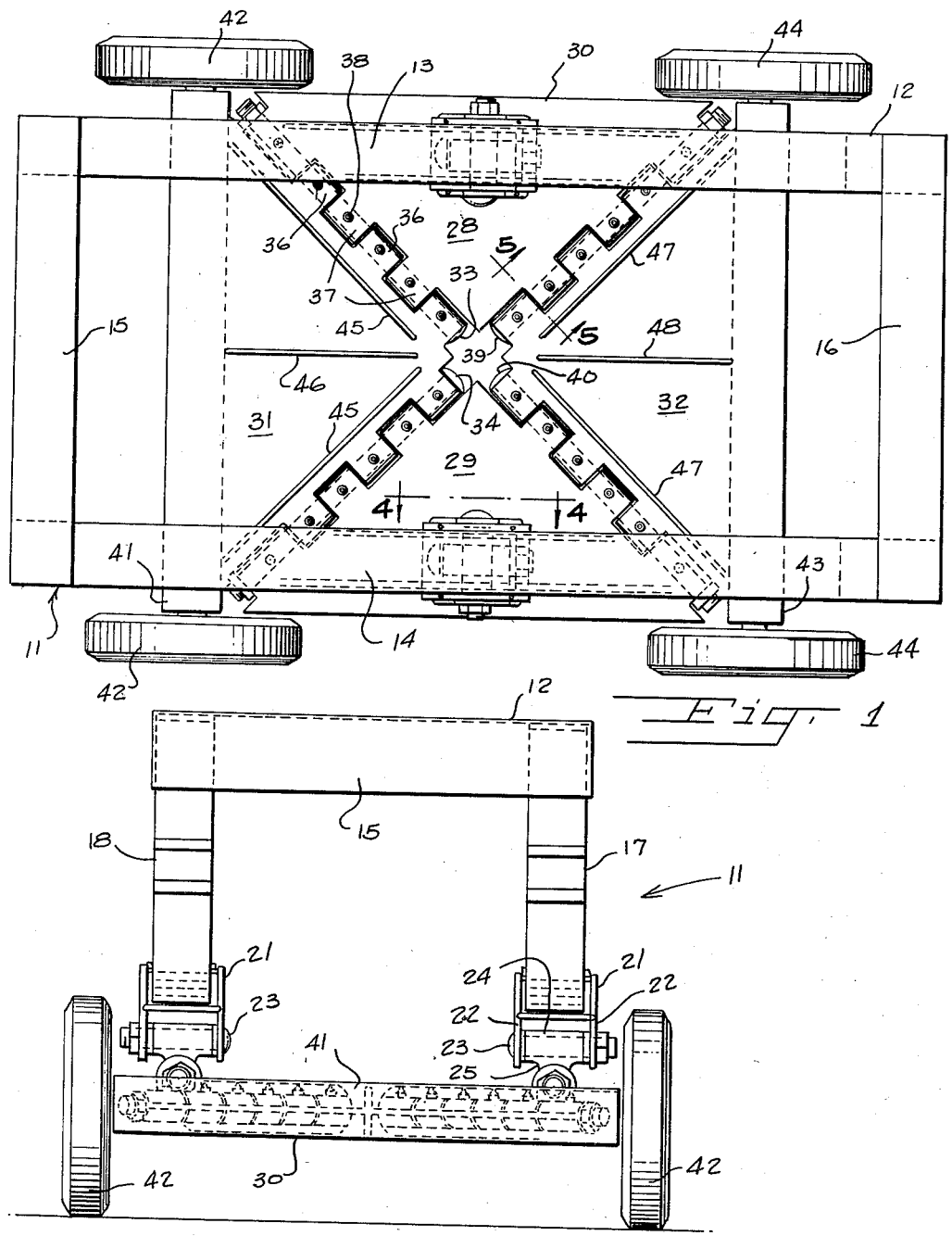

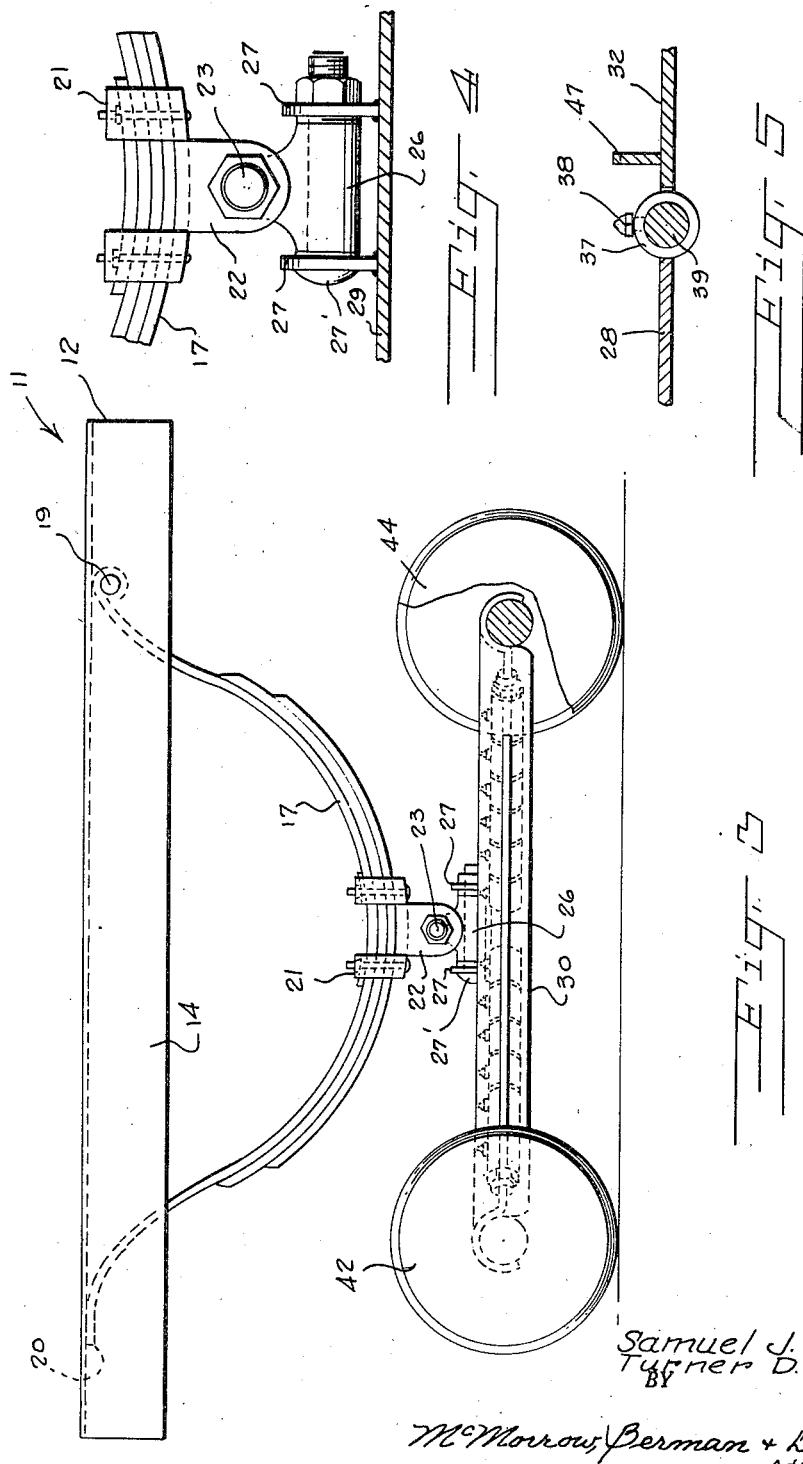

2,800,338

TANDEM AXLE CONSTRUCTION FOR TRAILER TRUCKS AND OTHER VEHICLES

Samuel J. Stephens and Turner D. Flow, McCamey, Tex.

Application September 9, 1955, Serial No. 533,366

2 Claims. (Cl. 280—104.5)

This invention relates to tandem axle constructions for trailers and similar vehicles, and more particularly to an improved trailer or truck drag axle unit or adapter having tandem wheels arranged to automatically complensate for irregularities in the roadway surface traversed by the unit to maintain the wheels thereof in alignment and to distribute the weight or load placed thereon equally to each axle of the unit.

A main object of the invention is to provide a novel and improved tandem axle unit especially suitable for trailer trucks and similar vehicles, said unit being simple in construction, involving relatively few parts, and providing an efficient means of distributing the load placed thereon equally to the axles thereof and to the wheels thereof, regardless of obstacles or irregularities encountered by the wheels along the path of travel of the vehicle.

A further object of the invention is to provide an improved tandem axle construction for a trailer truck or similar wheeled, heavy duty vehicle, the improved construction involving inexpensive components, being highly durable, providing economical tire utilization, and providing a smoother riding quality to the vehicle equipped therewith than has been obtainable with the constructions heretofore employed.

Further objects and advantages of the invention will become apparent from the following description and claims, and from the accompanying drawings, wherein:

Figure 1 is a top plan view of an improved tandem axle construction according to the present invention.

Figure 2 is a front elevational view of the construction shown in Figure 1.

Figure 3 is a side elevational view of the tandem axle structure of Figures 1 and 2.

Figure 4 is an enlarged cross sectional detail view taken on the line 4—4 of Figure 1.

Figure 5 is an enlarged cross sectional detail view taken on the line 5—5 of Figure 1.

Referring to the drawings, 11 generally designates an improved tandem axle construction according to the present invention, said construction comprising a generally rectangular top frame 12 having the longitudinal side beams 13 and 14, said side beams being connected at their forward ends by a transverse beam 15, and at their rear ends by a transverse beam 16. Designated at 17 and 18 are respective leaf spring assemblies, said assemblies being pivotally connected at their rear ends to the rear portions of the side members 13 and 14, as by pivot pins 19, shown in Figure 3, and engaging the under sides of the forward portions of the side members 13 and 14, as at 20 in Figure 3.

As shown in Figure 3, the leaf spring assemblies are bowed downwardly and have connected to their mid portions the respective brackets 21, 21 which clampingly engage the segments of the leaf spring assemblies and which are formed with depending pivot lugs 22, 22 through which extend the pivot bolts 23. The pivot bolts 23 extend through the transversely arranged sleeve portions 24 of respective pivot connectors 25, said pivot connectors 25 being provided with longitudinally extending pivot sleeves 26 which are received between respective pairs of upstanding pivot lugs 27, 27 provided on respective triangular plate members 28 and 29 disposed beneath the side members 13 and 14 of the top frame 12. Longitudinally extending pivot bolts 27' extend through the lugs 27 and the pivot sleeves 26, as is clearly shown in Figure 4. Thus, the pivotally connected brackets 21 and 25 provide universal connections between the leaf spring assemblies 17 and 18 and the associated plate members 28 and 29.

Designated generally at 30 is a lower frame assembly which comprises the side plates 28 and 29 and which further comprises a front plate 31 and a rear plate 32, said plates 31 and 32 being also triangular in shape, as shown in Figure 1. Each of the plates 28, 29, 31 and 32 is generally in the form of an isosceles right triangle, and the sides of the triangular front plate 31 are hingedly connected to the forward sides of the side plate members 28 and 29 along diagonal axes by respective diagonal hinge bolts 33 and 34.

As shown the edges of the hingedly connected plates are formed with interleaved hinge sleeve elements 36 and 37 receiving the hinge bolts 33 and 34, the sleeve elements 36 and 37 being provided with suitable lubricant fittings 38 to receive grease or similar lubricant.

The rear member 32 is hingedly connected to the rear sides of the side members 28 and 29 along diagonal axes, as by hinge bolts 39 and 40, the hinge bolts 39 being aligned with the hinge bolt 34 and the hinge bolt 40 being aligned with the hinge bolt 33, as shown in Figure 1.

The forward plate member 31 is formed with a transversely extending axle housing 41 containing an axle on which are journaled the respective front wheels 42, 42 and the plate member 32 is formed with a suitable axle housing 43 containing a rear axle on which are journaled the respective rear wheels 44, 44, the wheels 42, 42 and 44, 44 being thus journaled on respective transverse axes at the forward and rear ends of the bottom frame assembly 30.

The forward plate member 31 is braced and stiffened by the provision of a plurality of upstanding stiffening ribs 45 and 46, arranged as shown in Figure 1, the ribs 45 extending adjacent the diagonal hinge connections and the rib 46 extending longitudinally between the ribs 45, 45, as shown. Similarly, the rear plate 32 is braced and stiffened by the provision of upstanding ribs 47 and 48, the ribs 47 extending adjacent the diagonal hinge connections at the forward edges of the plate member 42 and the upstanding rib 48 extending longitudinally between the ribs 47, 47 substantially in longitudinal alignment with the stiffening rib 46 of the plate member 31.

As will be readily apparent, the top frame 12 is secured in any suitable manner to the under side of a trailer or other vehicle to be transported by the assembly. In operation, the spring assemblies 17 and 18 provide a cushioned connection between the vehicle body and the bottom frame assembly 30, as well as universal connections between the leaf spring assemblies and said bottom frame assembly, as above described. When one of the wheels 42 or 44 encounters an irregularity or obstacle, the axle associated therewith tilts or pivots as the wheel follows such irregularity, whereby the hinged sections immediately adjacent to the wheel encountering the irregularities pivot with respect to the remaining two hinged sections of the bottom frame assembly 30, and thus do not substantially affect the orientation of the remaining wheels of the tandem axle structure. Thus, should the right wheel 42 of the assembly encounter an obstruction, the right wheel 42 will rise, causing the plate members 31 and 28 to swing upwardly around the pivot bolts 34 and 39. This will not affect the orientations of the rear wheels 44, 44, and will only slightly affect the orientation of the left front wheel 42, whereby the unit can pass over the obstacle with a minimum amount of shock and with only a momentary change in the alignment of the wheels. As will be also apparent, when a wheel goes over an obstacle, said wheel continues to carry only its normal load and there is no shifting of the loading from the other wheels to the wheel engaging the obstacle as occurs in conventional multiple wheel truck assemblies of the prior art.

While a specific embodiment of an improved tandem axle construction for a trailer truck or similar vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A tandem axle construction for a trailer truck or similar vehicle comprising a top frame element having longitudinal side portions, respective lower side frame elements disposed beneath said side portions, respective depending leaf spring members connected to said longitudinal side portions, universal pivot means connecting said leaf spring members to said lower side frame elements on a common transverse axis, a forward wheel bearing member, means hingedly connecting said forward wheel bearing member to the forward margins of said lower side frame elements on respective diagonal hinge axes, a rear wheel bearing member, and means hingedly connecting the rear margins of said lower side frame elements to the rear wheel bearing member on respective diagonal hinge axes respectively aligned with the first-named diagonal hinge axes.

2. A tandem axle construction for a trailer truck or similar vehicle comprising a top frame element having longitudinal side portions, respective lower side frame elements disposed beneath said side portions, respective depending leaf spring members connected to said longitudinal side portions, universal pivot means connecting said leaf spring members to said lower side frame elements on a common transverse axis, a forward wheel bearing member, means hingedly connecting said forward wheel bearing member to the forward margins of said lower side frame elements on respective diagonal hinge axes, a rear wheel bearing member, means hingedly connecting the rear margins of said lower side frame elements to the rear wheel bearing member on respective diagonal hinge axes respectively aligned with the first-named diagonal hinge axes, respective transverse axles mounted on said wheel bearing members, respective ground-engaging wheels on the ends of said axles, said aligned diagonal axes being coplanar and being at right angles to each other and at forty-five degrees to the transverse axles.

References Cited in the file of this patent
UNITED STATES PATENTS 1,856,461    Bretaud _____ May 3, 1932